(12) United States Patent
Faulkner

(10) Patent No.: US 12,718,704 B2
(45) Date of Patent: Aug. 25, 2026

(54) EDUCATIONAL TREASURE HUNTING GAME ASSEMBLY AND METHOD OF USE

(71) Applicant: Edward Faulkner, Marietta, PA (US)

(72) Inventor: Edward Faulkner, Marietta, PA (US)

( * ) Notice: Subject to any disclaimer, the term of this patent is extended or adjusted under 35 U.S.C. 154(b) by 577 days.

(21) Appl. No.: 18/229,153

(22) Filed: Aug. 1, 2023

(65) Prior Publication Data

US 2025/0046206 A1 Feb. 6, 2025

(51) Int. Cl.
*G09B 7/06* (2006.01)
*G09B 1/06* (2006.01)

(52) U.S. Cl.
CPC ............... *G09B 7/063* (2013.01); *G09B 1/06* (2013.01); *G09B 7/066* (2013.01)

(58) Field of Classification Search
CPC .......... G09B 7/063; G09B 7/066; G09B 1/06; A63F 3/00214; A63F 3/00145; A63F 9/08; A63F 9/012; A63F 2250/24; A63F 9/1204; A63F 9/0612; Y10T 70/7169; B65D 81/361
See application file for complete search history.

(56) References Cited

U.S. PATENT DOCUMENTS 2,911,740 A 11/1959 Miller
2,963,796 A 12/1960 Zalkind
4,149,717 A 4/1979 Seijiro
5,411,261 A 5/1995 Jacques
5,924,695 A 7/1999 Heykoop
10,543,421 B1 * 1/2020 Smith .................. A63F 9/0826
11,148,041 B1 * 10/2021 Ferry ........................ A63F 9/18

FOREIGN PATENT DOCUMENTS

WO WO-2009143306 A1 * 11/2009 ............. A63F 9/001
WO WO-2010018483 A1 * 2/2010 .............. A63F 9/24
WO WO2021076650 4/2021

* cited by examiner

*Primary Examiner* — Peter S Vasat
*Assistant Examiner* — Kenneth Harold Johansson

(57) ABSTRACT

An educational treasure hunting game assembly for providing an entertaining and educational game includes a chest comprising a box with a lockable lid. Each piece of a plurality of pieces is insertable into a respective void of a plurality of voids, which extends into the chest. Each piece is configured to present a challenge question to a player, to recognize a correct answer to the challenge question, and to provide a clue upon receipt of the correct answer to the challenge question. The pieces and the chest can be sequentially hidden by a game planner and sequentially found by the player. A first piece provides a clue to a second piece, and so on, until the last piece, which provides a clue to a location of the chest. Insertion of the pieces into the voids disengages the lock and provides the player access to a reward in the box.

20 Claims, 10 Drawing Sheets

EDUCATIONAL TREASURE HUNTING GAME ASSEMBLY AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to treasure hunting games and more particularly pertains to a new treasure hunting game for providing an entertaining and educational game.

(2) Description of Related Art Including Information Disclosed Under 37 CFR 1.97 and 1.98

The prior art relates to treasure hunting games but does not teach a treasure hunting game having pieces that can be opened by solving challenge questions, with the open piece providing a clue leading to the next piece, and wherein all the pieces must be collected and inserted into voids in a chest to open the chest.

BRIEF SUMMARY OF THE INVENTION

An embodiment of the disclosure meets the needs presented above by generally comprising a chest, which comprises a lid that is hingedly attached to a box into which a reward can be inserted. A lock is attached to the box and is configured to selectively attach to the lid so that the lid is fixedly attached to the box to prevent unauthorized access to the reward. Each piece of a plurality of pieces is insertable into a respective void of a plurality of voids, which extends into the chest. Each piece is configured to present a respective challenge question of a plurality of challenge questions, which may be in the form of cards, to a player, to recognize a correct answer to the respective challenge question, and to provide a clue upon receipt of the correct answer to the respective challenge question. The pieces of the plurality of pieces and the chest are configured to be sequentially hid by a game planner and sequentially found by the player so that a first one of the pieces provides a clue to a second one of the pieces, and so on, until a last one of the pieces, which provides a clue to a location of the chest. Insertion of the plurality of pieces into the plurality of voids disengages the lock and provides the player access to the reward.

Another embodiment of the disclosure includes a method of playing an educational treasure hunting game. The method entails provision of the educational treasure hunting game assembly, according to the disclosure above. Setup steps of the method are positioning a reward into the box of the chest, locking the lid, fitting each piece of the plurality of pieces with a respective card, inserting a clue into each piece, closing and locking the doors of the pieces, and hiding the chest and the pieces. Playing step of the method are finding the pieces, in sequence, by solving challenge questions and following clues, finding the chest based on the clue in the final piece, inserting the plurality of pieces into the voids to open the lid, and collecting the reward from the box.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
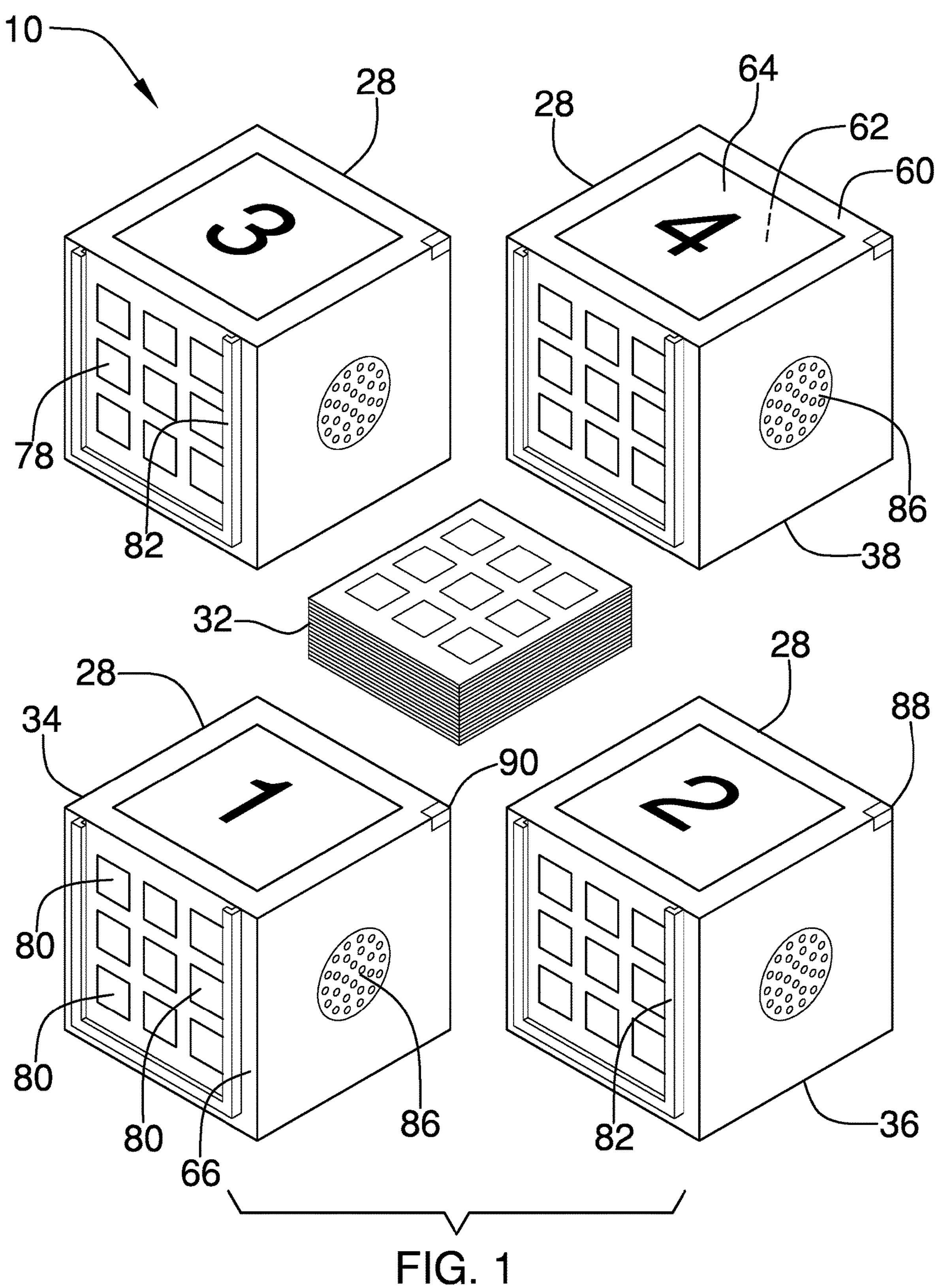
FIG. 1 is an isometric perspective view of an educational treasure hunting game assembly according to an embodiment of the disclosure.

With reference now to the drawings, and in particular to FIGS. 1 through 10 thereof, a new treasure hunting game embodying the principles and concepts of an embodiment of the disclosure and generally designated by the reference numeral 10 will be described.

As best illustrated in FIGS. 1 through 10, the educational treasure hunting game assembly 10 generally comprises a chest 12, which in turn comprises a lid 14 that is hingedly attached to a box 16 into which a reward 18 can be inserted. The lid 14 may be spring loaded. A lock 20 is attached to the box 16 and is configured to selectively attach to the lid 14, thereby fixedly attaching the lid 14 to the box 16 to prevent unauthorized access to the reward 18. The lock 20 may comprise a base latch receiver 22, which is attached to the box 16 and which is configured to selectively engage a top latch 24 that is attached to the lid 14. A base actuator 26 is attached to the box 16 and is operationally engaged to the base latch receiver 22. The lock 20 also may comprise other locking means, such as, but not limited to, electromagnetic locks, electronic locks, or the like.

Figure 2:
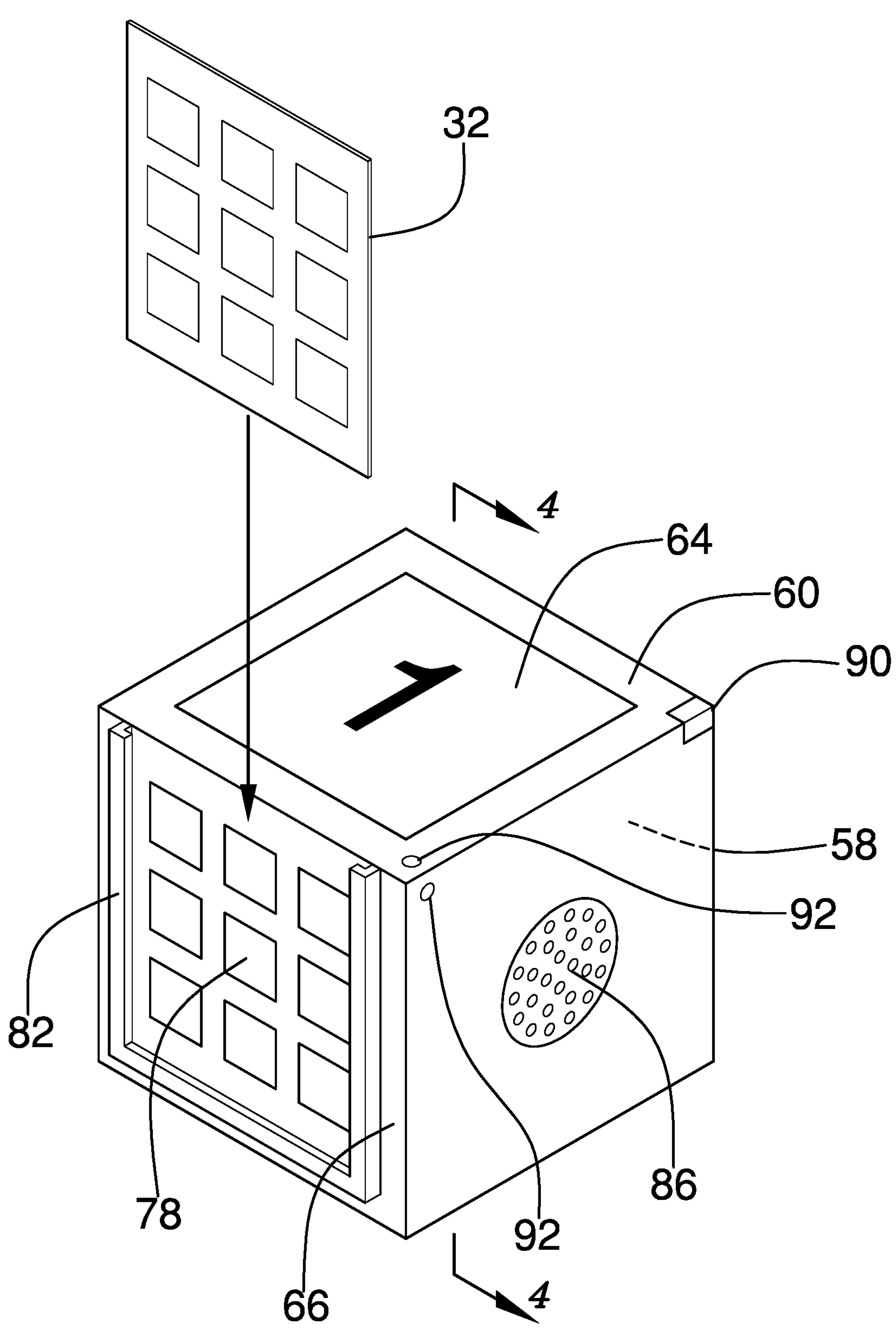
FIG. 2 is an in-use view of an embodiment of the disclosure.

Each piece 28 of a plurality of pieces 28 is insertable into a respective void 30 of a plurality of voids 30, which extends into the chest 12. Each piece 28 is configured to present a respective challenge question of a plurality of challenge questions to a player, to recognize a correct answer to the respective challenge question, and to provide a clue upon receipt of the correct answer to the respective challenge question. Each card 32 of a plurality of cards 32 comprises a respective challenge question and is configured to be reversibly attachable to a respective piece 28, as is shown in FIG. 2. The present invention anticipates multiple pluralities of cards 32, each tailored to a particular age group and a particular educational topic, such as, but not limited to, geometric shapes, mathematics, science, history, or the like. A game planner would create the clues.

The pieces 28 and the chest 12 are configured to be sequentially hidden by the game planner and then sequentially found by the player. A first one 34 of the pieces 28 provides a clue to a second one 36 of the pieces 28, and so on, until a last one 38 of the pieces 28, which provides a clue to a location of the chest 12. Insertion of the plurality of pieces 28 into the plurality of voids 30 disengages the lock 20 and provides the player access to the reward 18, such as a toy, candies, money, gift cards, or the like.

A base battery 40 is attached to and is positioned in the box 16. The base battery 40 may be rechargeable, although the present invention also anticipates the base battery 40 being replaceable. A base port 42 is attached to the box 16 and is operationally engaged to control module 52. A charging cable 44 has a plug 46 that is insertable into the base port 42 and a connector 48 that is configured to engage a source of electrical current. The base battery 40 thus can be electrically engaged to the source of electrical current to charge the base battery 40.

A plurality of occupancy sensors 50 is attached to the box 16, with each occupancy sensor 50 being positioned in, or proximate to, a respective void 30 and being configured to detect insertion of a piece 28 into the respective void 30. A variety of means of determining occupancy are known in the prior art and are anticipated by the present invention, such as, but not limited to, switches, light beams, contact sensors, and the like.

A control module 52 is attached to and is positioned in the box 16. The control module 52 is operationally engaged to the base battery 40, the plurality of occupancy sensors 50, and the base actuator 26. Upon each one of the plurality of occupancy sensors 50 detecting insertion of a piece 28 into an associated void 30, the control module 52 signals the base actuator 26 to disengage the base latch receiver 22 from the top latch 24, thereby providing the player access to the reward 18.

A plurality of base bulbs 54 is attached to the box 16 and is operationally engaged to the control module 52. Each base bulb 54 is positioned proximate to a respective void 30 and is configured to illuminate upon insertion of a respective piece 28 into the respective void 30 to indicate to the player that the player is successfully unlocking the chest 12. The base bulb 54 may comprise a base light emitting diode 56, an incandescent bulb, or the like.

Figure 5:
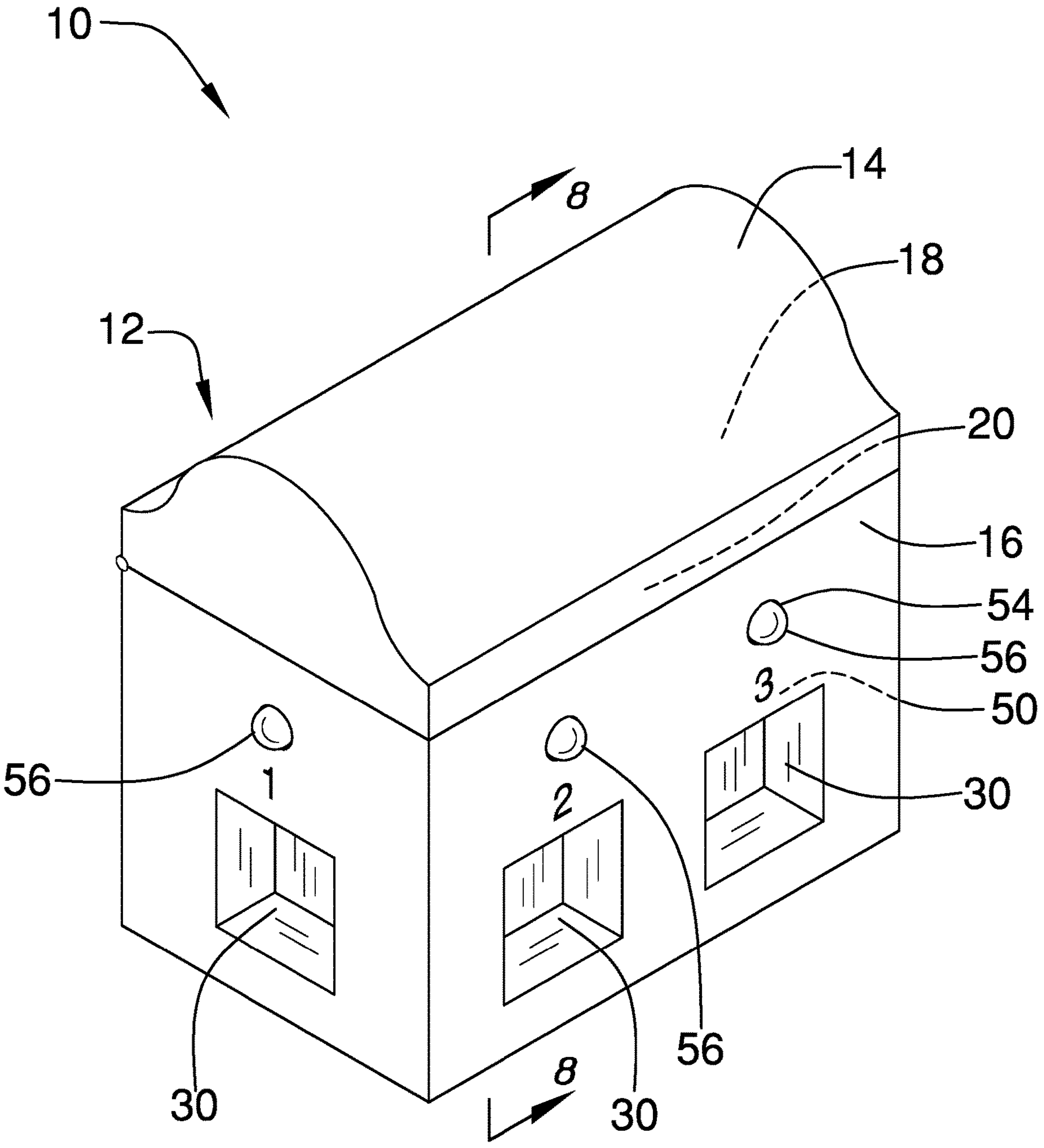
FIG. 5 is a front isometric perspective view of an embodiment of the disclosure.
Figure 6:
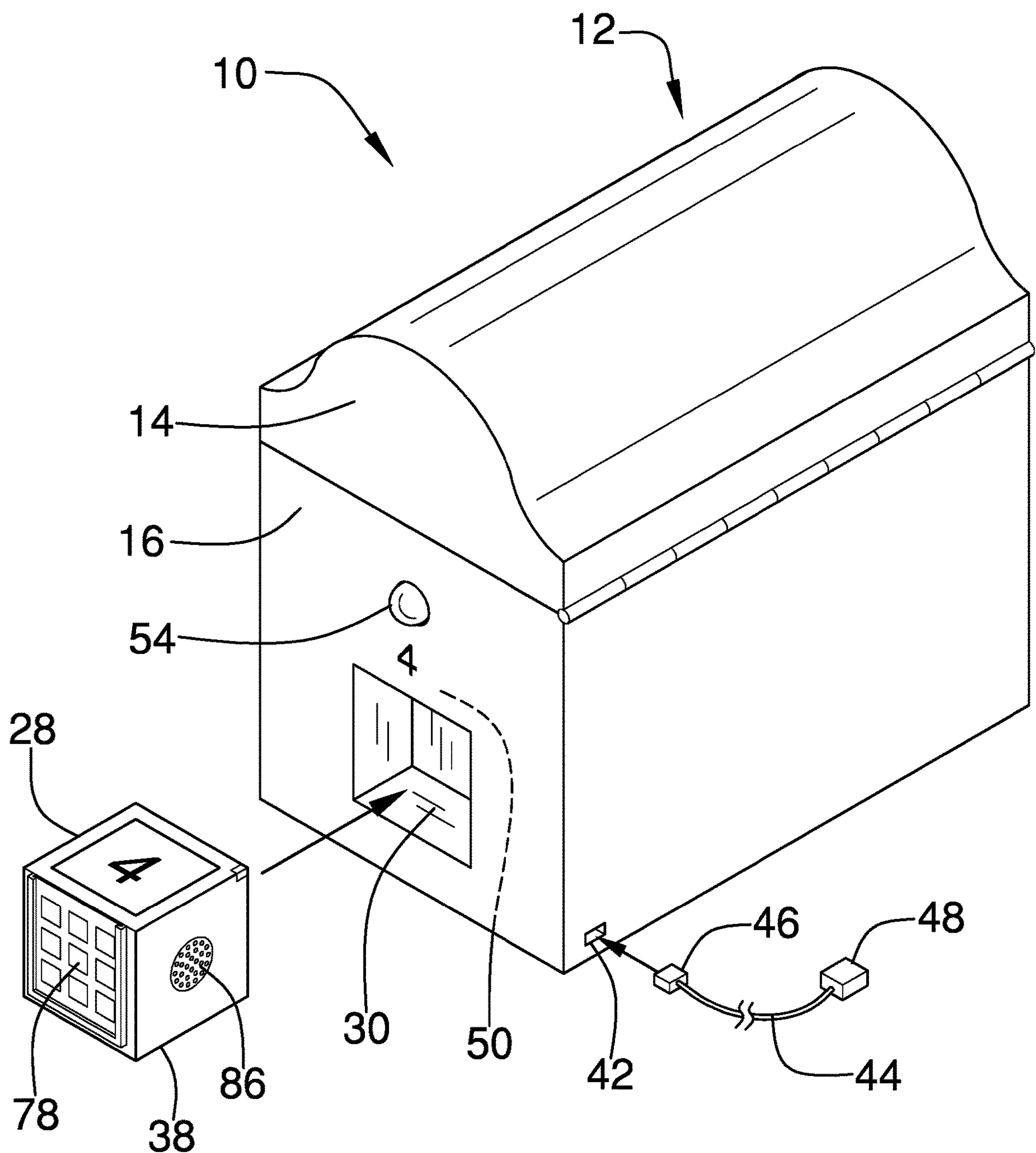
FIG. 6 is a rear isometric perspective view of an embodiment of the disclosure.
Figure 7:
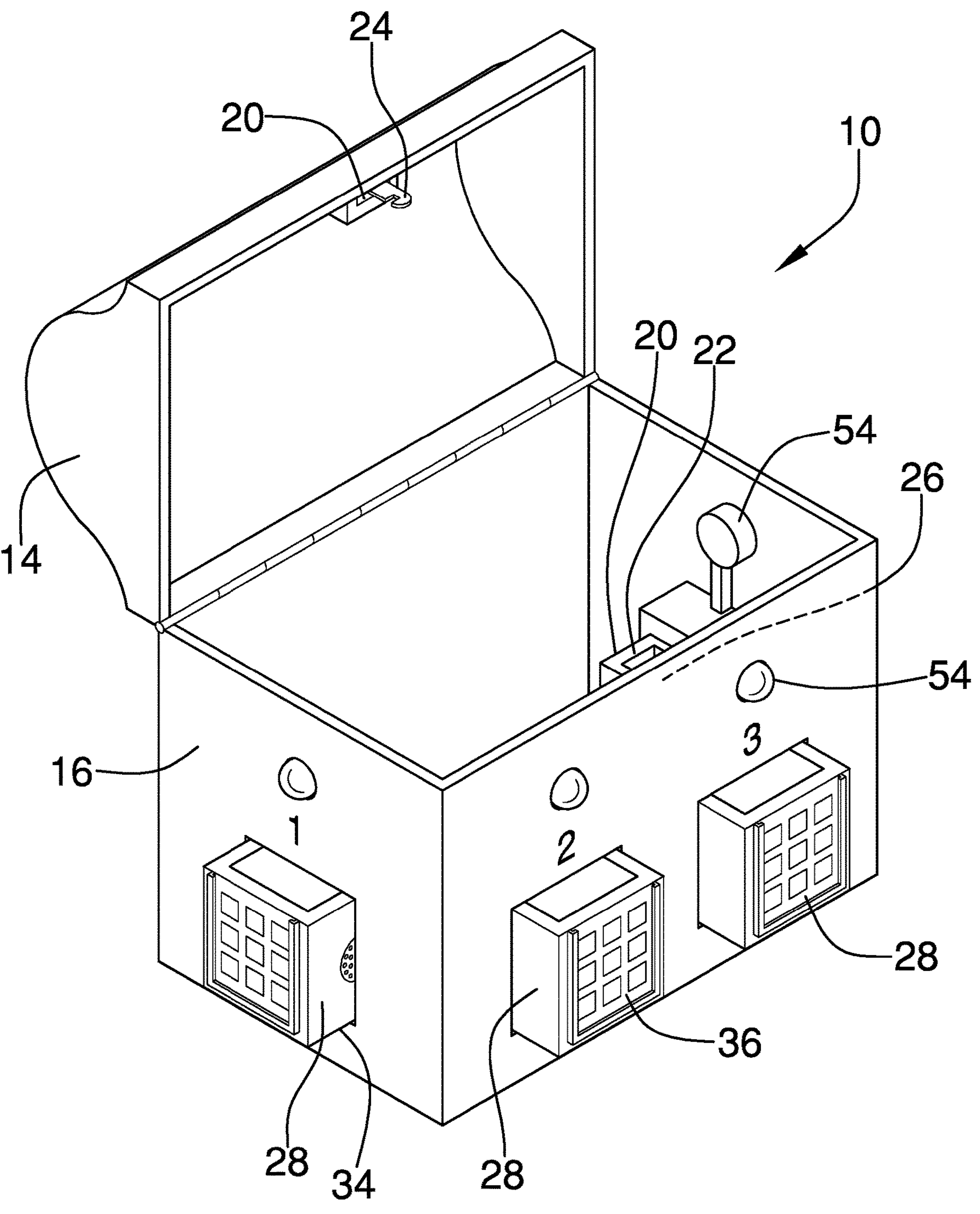
FIG. 7 is an in-use view of an embodiment of the disclosure.
Figure 8:
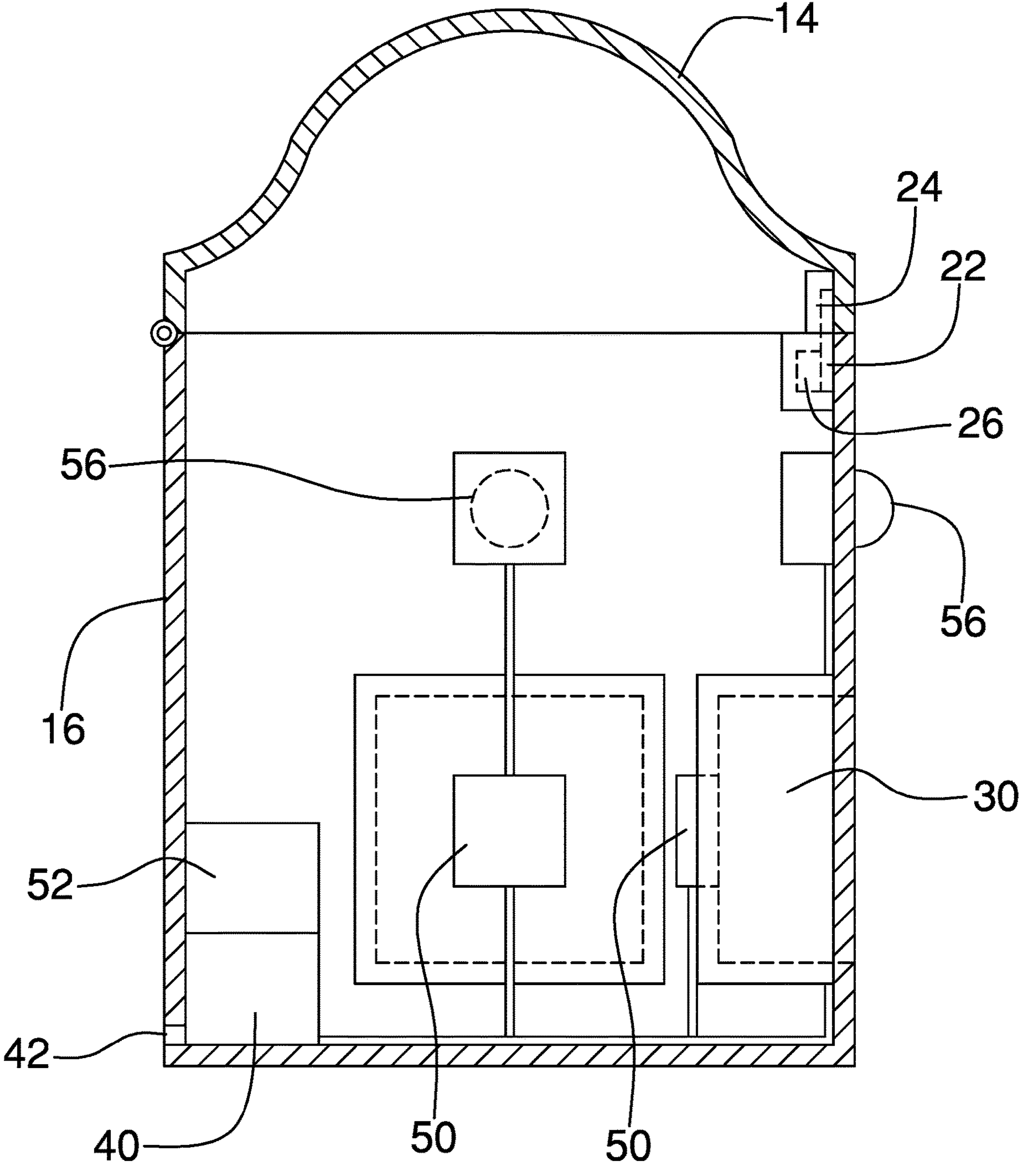
FIG. 8 is a cross-sectional view of an embodiment of the disclosure.
Figure 9:
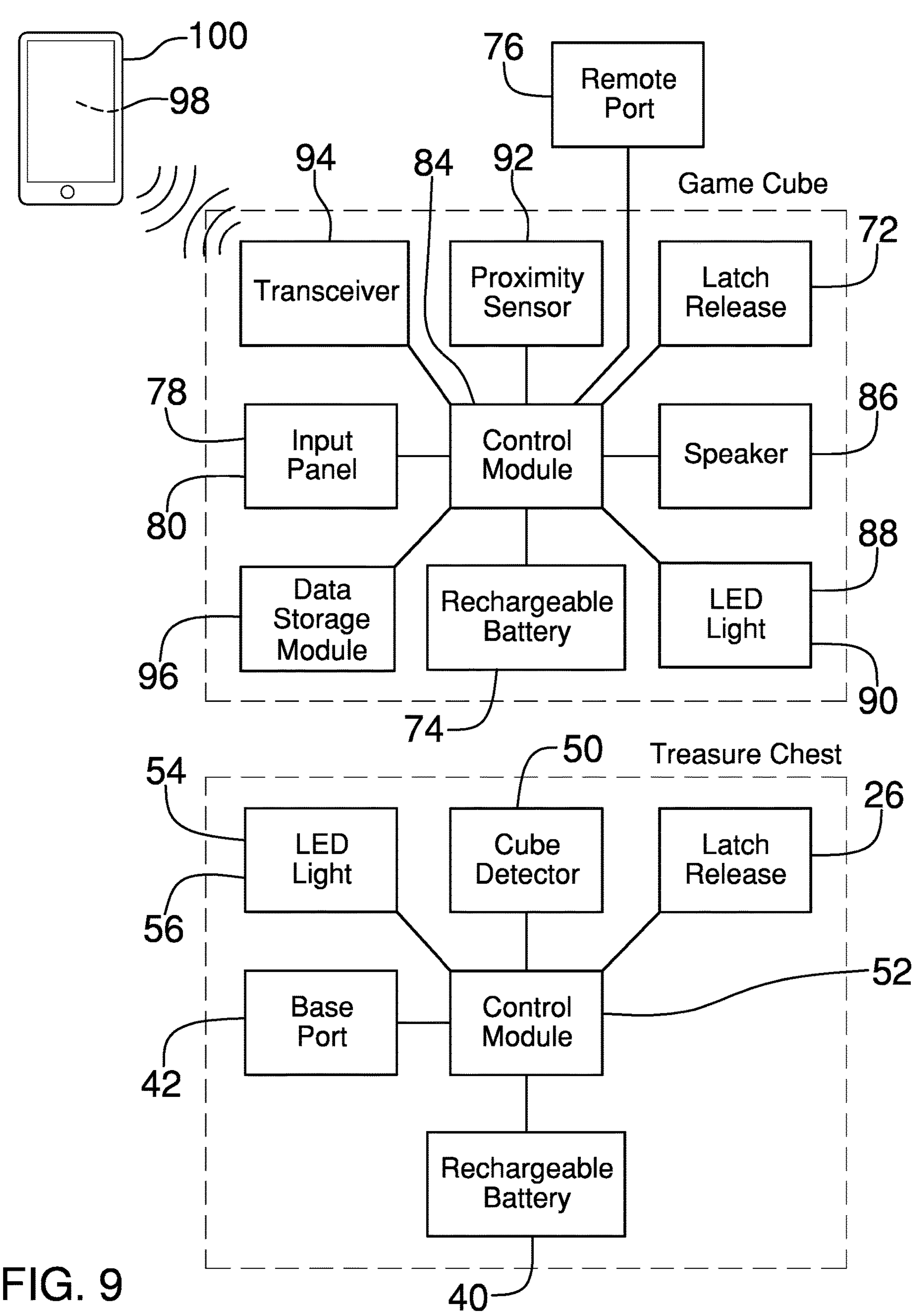
FIG. 9 is a block diagram of an embodiment of the disclosure.
Figure 10:
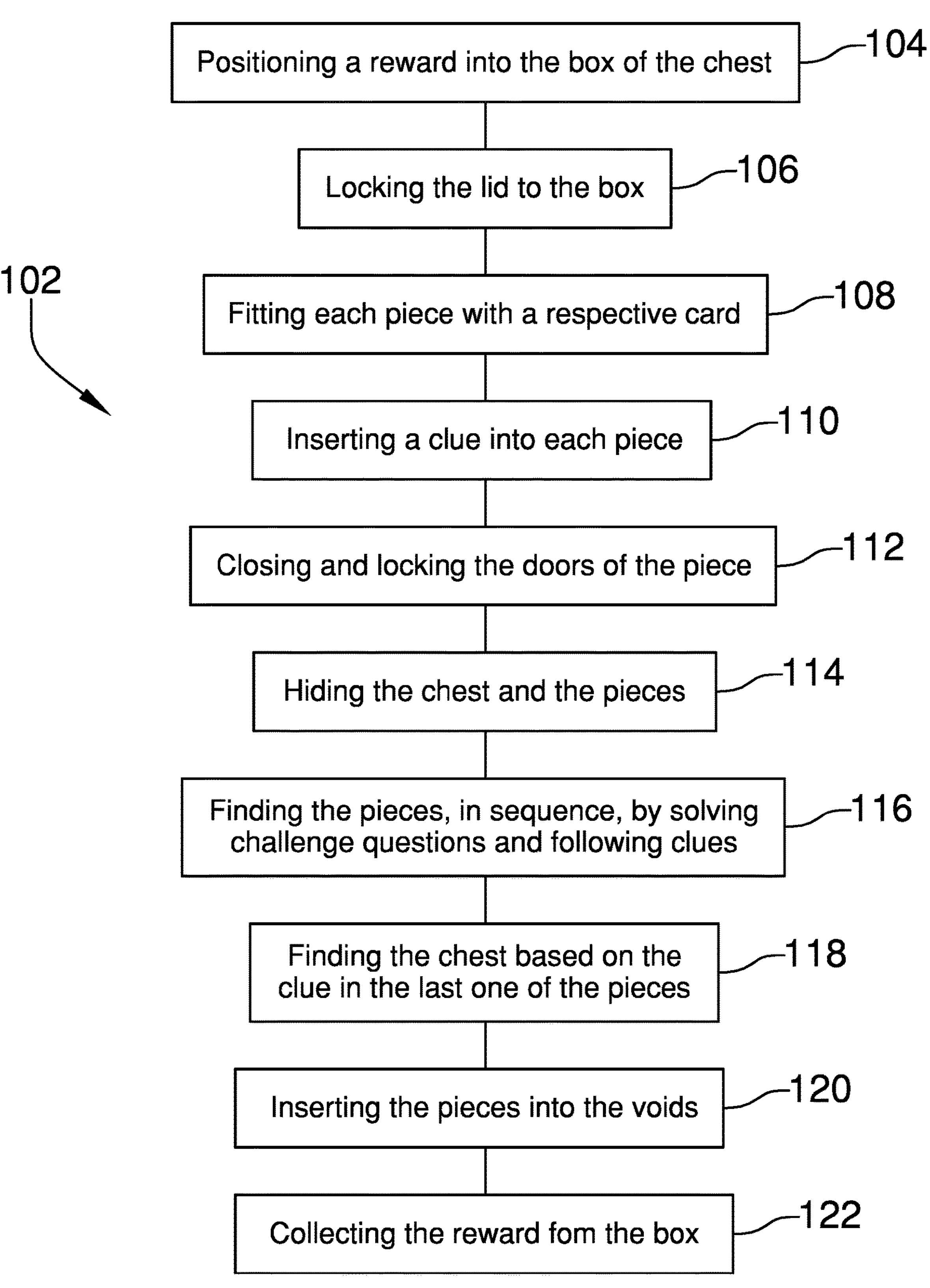
FIG. 10 is a flow diagram for a method utilizing an embodiment of the disclosure.

The plurality of voids 30 may be numerically equivalent to the plurality of pieces 28, although the present invention also anticipates the plurality of voids 30 being numerically nonequivalent to the plurality of pieces 28. The plurality of pieces 28 may comprise four pieces 28 and the plurality of voids 30 may comprise four voids 30, as is shown in FIGS. 1, 5, and 6. The pieces 28 and the voids 30 may be cuboid, as is shown in FIG. 1, or alternatively shaped, such as, but not limited to, prismatic, frustrum shaped, or the like. As any number of pieces 28 and any number of voids 30 is anticipated, the control module 52 may be programmable to open the chest 12 upon insertion of a quantity of pieces 28 that is lower than the quantity of voids 30.

Each piece 28 defines an interior space 58. An upper facet 60 of each piece 28 has an opening 62 positioned therein so that a respective clue is insertable into the piece 28. Each piece 28 comprises a door 64, which is spring loaded, hingedly attached to a respective sidewall 66 of the piece 28, and positioned to close the opening 62. A remote latch 68 is attached to the door 64. A remote receiver 70 is attached to the piece 28 and is positioned in the interior space 58. The remote receiver 70 is configured to engage the remote latch 68 to secure the door 64 over the opening 62 to prevent unauthorized access to the respective clue. A remote actuator 72, which is attached to the piece 28 proximate to the remote receiver 70, also is operationally engaged to the remote receiver 70. In place of the remote latch 68 and the remote receiver 70, the present invention also anticipates other locking means, which may comprise, but are not limited to, electromagnetic locks, electronic locks, or the like.

A remote battery 74 is attached to the piece 28 and is positioned in the interior space 58. The remote battery 74 may be rechargeable, although the present invention also anticipates the remote battery 74 being replaceable. A remote port 76, which is complementary to the plug 46 of the charging cable 44, allows the remote battery 74 to be electrically engaged to the source of electrical current to charge the remote battery 74.

Figure 3:
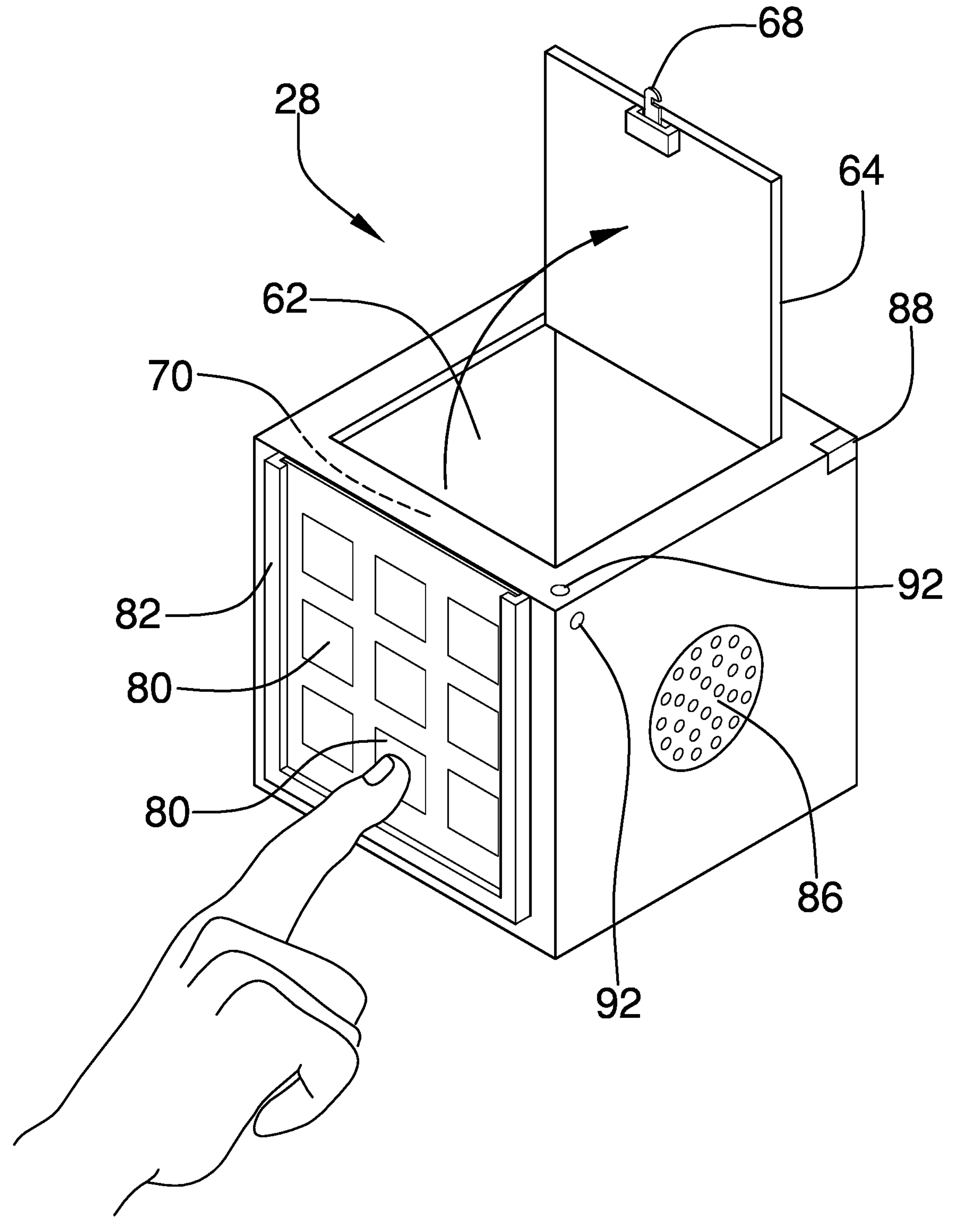
FIG. 3 is an in-use view of an embodiment of the disclosure.
Figure 4:
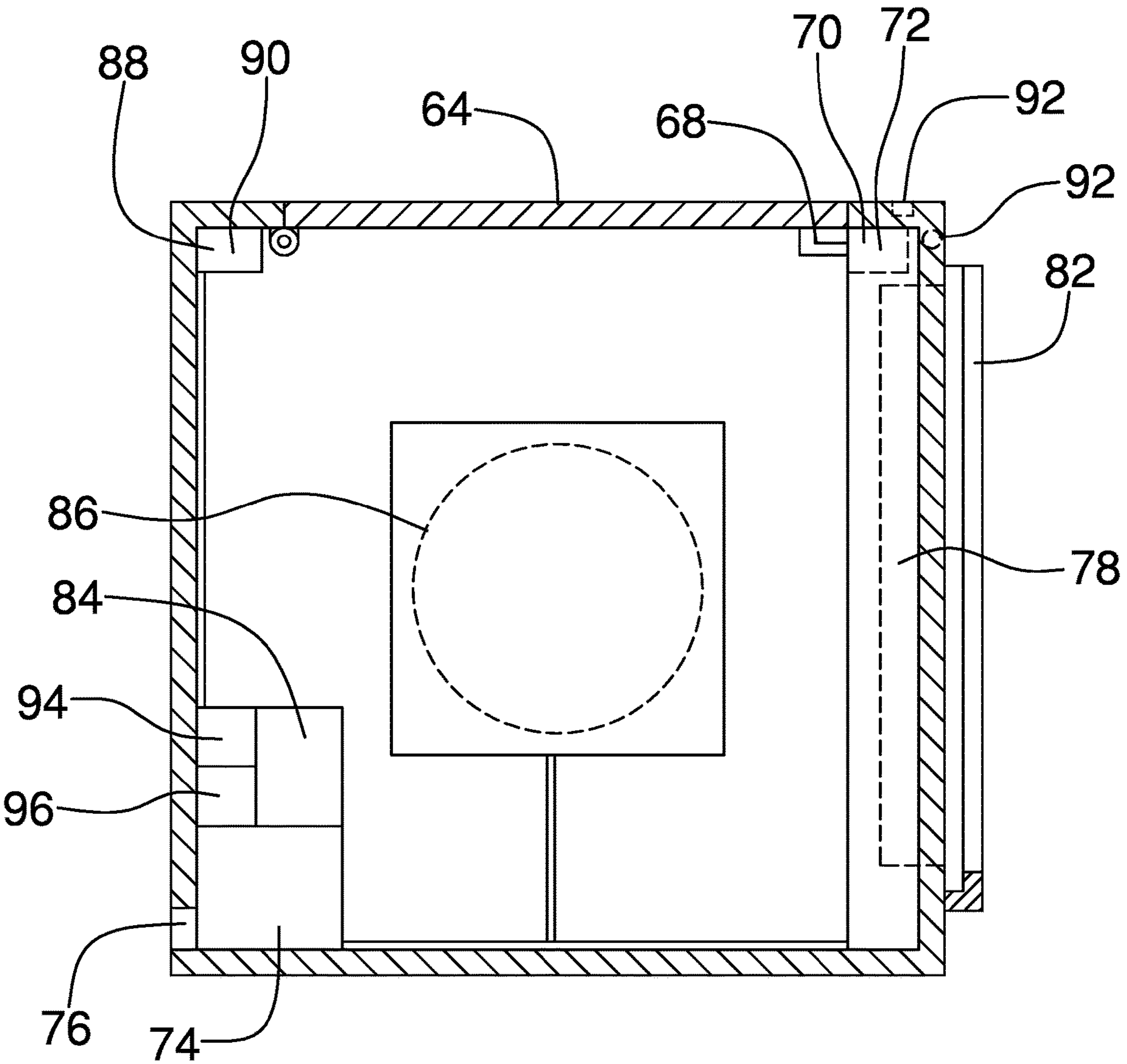
FIG. 4 is a cross-sectional view of an embodiment of the disclosure.

An input panel 78 is attached to a respective sidewall 66 of the piece 28 and is configured to be manipulated by the player to enter an answer to the challenge question. The input panel 78 may comprise a plurality of depressible buttons 80, as is shown in FIG. 3, or other input means, such as, but not limited to, touch panels, switches, or the like. A U-shaped bracket 82 is attached to the piece 28 and is configured for insertion of a respective card 32. As is shown in FIG. 2, the U-shaped bracket 82 is positioned such that insertion of the respective card 32 covers the input panel 78.

A microprocessor 84 is attached to the piece 28, is positioned in the interior space 58, and is operationally engaged to the remote battery 74, the remote actuator 72, the remote actuator 72, and the input panel 78. Upon entry of a correct answer to the respective challenge question into the input panel 78, the microprocessor 84 signals the remote actuator 72 to disengage the remote receiver 70 from the remote latch 68 to provide the player access to the respective clue within the piece 28.

A speaker 86 and a remote bulb 88 are attached to the piece 28 and are operationally engaged to the microprocessor 84. Upon entry of a correct answer to the respective challenge question into the input panel 78, the microprocessor 84 signals the speaker 86 and the remote bulb 88 to broadcast a confirmatory signal and to illuminate, respectively, to provide positive feedback to the player. The remote bulb 88 may comprise a remote light emitting diode 90, an incandescent bulb, or the like.

A proximity sensor 92 is attached to the piece 28, is positioned in the interior space 58, is operationally engaged to the microprocessor 84, and is configured to detect the player within a preset distance from the piece 28, positioning the microprocessor 84 to actuate one or more of the remote bulb 88 and the speaker 86 to facilitate localization of the piece 28 by the player. The present invention also anticipate a vibrator (not shown) which would be attached to the piece 28 and operationally engaged to the microprocessor 84. The vibrator would cause the piece 28 to vibrate when the player is in proximity to the piece 28.

A transceiver 94 and a data storage module 96 are attached to the piece 28, are positioned in the interior space 58, and are operationally engaged to the microprocessor 84. Programming code 98, which is selectively positionable on an electronic device 100 of the game planner, such as a smartphone, tablet, or the like, enables the game planner to use the electronic device 100 to selectively transmit challenge questions and clues to a respective piece 28, via the transceiver 94, to be stored in the data storage module 96. The microprocessor 84 is programmed to selectively actuate the speaker 86 to broadcast one or both of the challenge question, upon the proximity sensor 92 being actuated, and a clue, upon input of a correct answer to the challenge question. The present invention also anticipates the piece 28 comprising a microphone (not shown) and the microprocessor 84 being programmed to assess whether or not a verbal response to the challenge question is correct.

In use, the educational treasure hunting game assembly enables a method of playing an educational treasure hunting game 102. The method 102 entails provision of the educational treasure hunting game assembly 10, according to the specification above. A first setup step 104 of the method 102 is positioning a reward 18 into the box 16 of the chest 12. A second setup step 106 of the method 102 is locking the lid 14 to the box 16 to prevent unauthorized access to the reward 18. A third setup step 108 of the method 102 is fitting each piece 28 with a respective card 32. A fourth setup step 110 of the method 102 is inserting a clue into each piece 28. A fifth setup step 112 of the method 102 is closing and locking the door 64 of each piece 28. A sixth setup step 114 of the method 102 is hiding the chest 12 and the pieces 28. A first playing step 116 of the method 102 is finding the pieces 28, in sequence, by solving challenge questions and following clues. A second playing step 118 of the method 102 is finding the chest 12 based on the clue in the last one 38 of the pieces 28. A third playing step 120 of the method 102 is inserting the pieces 28 into the voids 30 to open the lid 14. A fourth playing step 122 of the method 102 is collecting the reward 18 from the box 16.

As will be apparent to those skilled in the art of treasure hunting games, there are a nearly endless number of possible variations in methods for playing treasure hunting games utilizing the educational treasure hunting game assembly 10. For example, the present invention also anticipates the player being provided a first clue to a location of the first one 34 of the pieces 28, being required to correctly answer a final challenge question before the chest 12 will open, having to answer more than one challenge question to receive a clue, and the like.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An educational treasure hunting game assembly comprising:

a chest comprising a lid hingedly attached to a box into which a reward can be inserted;

a lock attached to the box and being configured to selectively attach to the lid, such that the lid is fixedly attached to the box to prevent unauthorized access to the reward;

a plurality of pieces, each piece being insertable into a respective void of a plurality of voids extending into the chest, such that insertion of the plurality of pieces into the plurality of voids disengages the lock and provides a player access to the reward, each piece being configured to present a respective challenge question of a plurality of challenge questions to the player, to recognize a correct answer to the respective challenge question, and to provide a clue upon receipt of the correct answer to the challenge question; and wherein the pieces of the plurality of pieces and the chest are configured to be sequentially hid by a game planner and sequentially found by the player, such that a first one of the pieces provides a clue to a second one of the pieces, and so on, until a last one of the pieces, the last one of the pieces providing a clue to a location of the chest.

2. The educational treasure hunting game assembly of claim 1, further including:

the lock comprising a base latch receiver attached to the box and being configured to selectively engage a top latch attached to the lid;

a base battery attached to and positioned in the box;

a base actuator attached to the box and being operationally engaged to the base latch receiver;

a plurality of occupancy sensors attached to the box, each occupancy sensor of the plurality of occupancy sensors being positioned in or proximate to a respective void of the plurality of voids and being configured to detect insertion of a piece into the respective void; and a control module attached to and positioned in the box, the control module being operationally engaged to the base battery, the plurality of occupancy sensors, and the base actuator, such that, upon each one of the plurality of occupancy sensors detecting insertion of a piece into an associated void, the control module signals the base actuator to disengage the base latch receiver from the top latch to provide the player access to the reward.

3. The educational treasure hunting game assembly of claim 2, further including a plurality of base bulbs attached to the box and operationally engaged to the control module, each base bulb of the plurality of base bulbs being positioned proximate to a respective void and being configured to illuminate upon insertion of a respective piece into the respective void.

4. The educational treasure hunting game assembly of claim 3, wherein the base bulb comprises a base light emitting diode.

5. The educational treasure hunting game assembly of claim 2, further including:

the base battery being rechargeable;

a base port attached to the box and operationally engaged to control module; and a charging cable having a plug insertable into the base port and a connector configured for engaging a source of electrical current, such that the base battery is electrically engaged to the source of electrical current to charge the base battery.

6. The educational treasure hunting game assembly of claim 1, wherein the plurality of voids is numerically equivalent to the plurality of pieces.

7. The educational treasure hunting game assembly of claim 6, wherein the plurality of pieces comprises four pieces, the plurality of voids comprises four voids.

8. The educational treasure hunting game assembly of claim 1, wherein the pieces of the plurality of pieces and the voids of the plurality of voids are cuboid.

9. The educational treasure hunting game assembly of claim 1, wherein each piece defines an interior space, an upper facet of each piece having an opening positioned therein, such that a respective clue is insertable into the piece, and wherein each piece comprises:

a door hingedly attached to a respective sidewall of the piece and being positioned to close the opening, the door being spring loaded;

a remote latch attached to the door;

a remote receiver attached to the piece and positioned in the interior space, the remote receiver being configured to engage the remote latch to secure the door over the opening to prevent unauthorized access to the respective clue;

a remote battery attached to the piece and positioned in the interior space;

a remote actuator attached to the piece proximate to the remote receiver, the remote actuator being operationally engaged to the remote receiver;

an input panel attached to a respective sidewall of the piece and being configured to be manipulated by the player to enter an answer to the challenge question; and a microprocessor attached to the piece, positioned in the interior space, and being operationally engaged to the remote battery, the remote actuator, the remote actuator, and the input panel, such that upon entry of a correct answer to the respective challenge question into the input panel, the microprocessor signals the remote actuator to disengage the remote receiver from the remote latch to provide the player access to the respective clue within the piece.

10. The educational treasure hunting game assembly of claim 9, wherein the input panel comprises a plurality of depressible buttons.

11. A method of playing an educational treasure hunting game, the method comprising providing the educational treasure hunting game assembly of claim 10, and:

the game planner:

positioning a reward into the box of the chest;

locking the lid to the box to prevent unauthorized access to the reward;

fitting each piece of the plurality of pieces with a respective card of the plurality of cards;

inserting a clue into each piece of the plurality of pieces;

closing and locking the door of each piece of the plurality of pieces; and hiding the chest and the plurality of pieces;

the player:

finding the pieces of the plurality of pieces, in sequence, by solving challenge questions and following clues;

finding the chest based on the clue in the last one of the pieces;

inserting the plurality of pieces into the plurality of voids to open the lid; and collecting the reward from the box.

12. The educational treasure hunting game assembly of claim 9, further including a plurality of cards, each card of the plurality of cards comprising a respective challenge question and being configured to be reversibly attachable to a respective piece of the plurality of pieces.

13. The educational treasure hunting game assembly of claim 12, further including a U-shaped bracket attached to the piece and being configured for insertion of a respective card, the U-shaped bracket being positioned such that insertion of the respective card covers the input panel.

14. The educational treasure hunting game assembly of claim 9, further including a speaker attached to the piece and operationally engaged to the microprocessor, such that upon entry of a correct answer to the respective challenge question into the input panel, the microprocessor signals the speaker to broadcast a confirmatory signal.

15. The educational treasure hunting game assembly of claim 14, further including a remote bulb attached to the piece and operationally engaged to the microprocessor, such that upon entry of a correct answer to the respective challenge question into the input panel, the microprocessor signals the remote bulb to illuminate.

16. The educational treasure hunting game assembly of claim 15, wherein the remote bulb comprises a remote light emitting diode.

17. The educational treasure hunting game assembly of claim 15, further including a proximity sensor attached to each piece, positioned in the interior space, being configured to detect the player within a preset distance from the piece, and being operationally engaged to the microprocessor, such that when the player is detected by the proximity sensor, the microprocessor actuates the remote bulb and the speaker to facilitate localization of the piece by the player.

18. The educational treasure hunting game assembly of claim 16, further including:

a transceiver attached to the piece, positioned in the interior space, and operationally engaged to the microprocessor;

a non-transitory data storage module attached to the piece, positioned in the interior space, and operationally engaged to the microprocessor; and programming code non-transitorily positioned on an electronic device of the game planner enabling the game planner to use the electronic device to selectively transmit challenge questions and clues to a respective piece, via the transceiver, to be stored in the non-transitory data storage module, the microprocessor being programmed to selectively actuate the speaker to broadcast one or both of the challenge question, upon the proximity sensor being actuated, and a clue, upon input of a correct answer to the challenge question.

19. The educational treasure hunting game assembly of claim 9, further including:

the remote battery being rechargeable; and a remote port complementary to the plug of a charging cable, such that the remote battery is electrically engageable to the source of electrical current to charge the remote battery.

20. An educational treasure hunting game assembly comprising:

a chest comprising a lid hingedly attached to a box into which a reward can be inserted;

a lock attached to the box and being configured to selectively attach to the lid, such that the lid is fixedly attached to the box to prevent unauthorized access to the reward;

a plurality of pieces, each piece being insertable into a respective void of a plurality of voids extending into the chest, such that insertion of the plurality of pieces into the plurality of voids disengages the lock and provides a player access to the reward, each piece being configured to present a respective challenge question of a plurality of challenge questions to the player, to recognize a correct answer to the respective challenge question, and to provide a clue upon receipt of the correct answer to the challenge question, wherein the pieces of the plurality of pieces and the chest are configured to be sequentially hid by a game planner and sequentially found by the player, such that a first one of the pieces provides a clue to a second one of the pieces, and so on, until a last one of the pieces, the last one of the pieces providing a clue to a location of the chest, the lock comprising a base latch receiver attached to the box and being configured to selectively engage a top latch attached to the lid;

a base battery attached to and positioned in the box, the base battery being rechargeable; a base actuator attached to the box and being operationally engaged to the base latch receiver;

a plurality of occupancy sensors attached to the box, each occupancy sensor of the plurality of occupancy sensors being positioned in or proximate to a respective void of the plurality of voids and being configured to detect insertion of a piece into the respective void;

a control module attached to and positioned in the box, the control module being operationally engaged to the base battery, the plurality of occupancy sensors, and the base actuator, such that, upon each one of the plurality of occupancy sensors detecting insertion of a piece into an associated void, the control module signals the base actuator to disengage the base latch receiver from the top latch to provide the player access to the reward;

a plurality of base bulbs attached to the box and operationally engaged to the control module, each base bulb of the plurality of base bulbs being positioned proximate to a respective void and being configured to illuminate upon insertion of a respective piece into the respective void, the base bulb comprising a base light emitting diode;

a base port attached to the box and operationally engaged to control module;

a charging cable having a plug insertable into the base port and a connector configured for engaging a source of electrical current, such that the base battery is electrically engaged to the source of electrical current to charge the base battery;

the plurality of voids being numerically equivalent to the plurality of pieces, the plurality of pieces comprising four pieces, the plurality of voids comprising four voids, the pieces of the plurality of pieces and the voids of the plurality of voids being cuboid;

a plurality of cards, each card of the plurality of cards comprising a respective challenge question and being configured to be reversibly attachable to a respective piece of the plurality of pieces;

each piece defining an interior space, an upper facet of each piece having an opening positioned therein, such that a respective clue is insertable into the piece, each piece comprising:

a door hingedly attached to a respective sidewall of the piece and being positioned to close the opening, the door being spring loaded;

a remote latch attached to the door;

a remote receiver attached to the piece and positioned in the interior space, the remote receiver being configured to engage the remote latch to secure the door over the opening to prevent unauthorized access to the respective clue;

a remote battery attached to the piece and positioned in the interior space, the remote battery being rechargeable;

a remote actuator attached to the piece proximate to the remote receiver, the remote actuator being operationally engaged to the remote receiver;

an input panel attached to a respective sidewall of the piece and being configured to be manipulated by the player to enter an answer to the challenge question, the input panel comprising a plurality of depressible buttons;

a microprocessor attached to the piece, positioned in the interior space, and being operationally engaged to the remote battery, the remote actuator, the remote actuator, and the input panel, such that upon entry of a correct answer to the respective challenge question into the input panel, the microprocessor signals the remote actuator to disengage the remote receiver from the remote latch to provide the player access to the respective clue within the piece;

a speaker attached to the piece and operationally engaged to the microprocessor, such that upon entry of a correct answer to the respective challenge question into the input panel, the microprocessor signals the speaker to broadcast a confirmatory signal;

a remote bulb attached to the piece and operationally engaged to the microprocessor, such that upon entry of a correct answer to the respective challenge question into the input panel, the microprocessor signals the remote bulb to illuminate, the remote bulb comprising a remote light emitting diode;

a proximity sensor attached to each piece, positioned in the interior space, being configured to detect the player within a preset distance from the piece, and being operationally engaged to the microprocessor, such that when the player is detected by the proximity sensor, the microprocessor actuates the remote bulb and the speaker to facilitate localization of the piece by the player;

a transceiver attached to the piece, positioned in the interior space, and operationally engaged to the microprocessor;

a non-transitory data storage module attached to the piece, positioned in the interior space, and operationally engaged to the microprocessor; and a remote port complementary to the plug of the charging cable, such that the remote battery is electrically engageable to the source of electrical current to charge the remote battery;

programming code selectively executable on an electronic device of the game planner enabling the game planner to use the electronic device to selectively transmit challenge questions and clues to a respective piece, via the transceiver, to be stored in the non-transitory data storage module, the microprocessor being programmed to selectively actuate the speaker to broadcast one or both of the challenge question, upon the proximity sensor being actuated, and a clue, upon input of a correct answer to the challenge question; and a U-shaped bracket attached to the piece and being configured for insertion of a respective card, the U-shaped bracket being positioned such that insertion of the respective card covers the input panel.

* * * * *